United States Patent
Oguro

(10) Patent No.: US 6,903,545 B2
(45) Date of Patent: Jun. 7, 2005

(54) ROTATION DETECTING DEVICE FOR DETECTING ROTATION OF A VEHICLE WHEEL

(75) Inventor: Yuji Oguro, Nagaoka Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 10/380,001

(22) PCT Filed: Mar. 25, 2002

(86) PCT No.: PCT/JP02/02873

§ 371 (c)(1),
(2), (4) Date: Mar. 11, 2003

(87) PCT Pub. No.: WO03/008982

PCT Pub. Date: Jan. 30, 2003

(65) Prior Publication Data

US 2003/0183005 A1 Oct. 2, 2003

(30) Foreign Application Priority Data

Jul. 13, 2001 (JP) .......................................... 2001-214020
Dec. 18, 2001 (JP) .......................................... 2001-384253

(51) Int. Cl.$^7$ .............................. G01B 7/14; G01P 3/48
(52) U.S. Cl. ........................... 324/207.22; 324/207.25; 324/173
(58) Field of Search ................................. 324/173, 174, 324/207.2–207.22, 207.25; 334/448

(56) References Cited

U.S. PATENT DOCUMENTS

| | | | | | |
|---|---|---|---|---|---|
| 4,160,234 A | * | 7/1979 | Karbo et al. | ................. | 340/443 |
| 4,652,149 A | * | 3/1987 | Nakaoka et al. | ............ | 384/100 |
| 5,166,611 A | * | 11/1992 | Kujawa et al. | .............. | 324/166 |
| 5,880,585 A | * | 3/1999 | Oguro | ......................... | 324/174 |
| 6,186,667 B1 | * | 2/2001 | Nakamura et al. | .......... | 384/448 |
| 6,637,754 B1 | * | 10/2003 | Ohtsuki et al. | ............. | 277/549 |

FOREIGN PATENT DOCUMENTS

| | | |
|---|---|---|
| JP | 2-264817 | 10/1990 |
| JP | 9-229714 | 9/1997 |
| JP | 2000-249715 A | 9/2000 |
| JP | 2000-356645 A | 12/2000 |

* cited by examiner

Primary Examiner—Edward Lefkowitz
Assistant Examiner—Reena Aurora
(74) Attorney, Agent, or Firm—McDermott Will & Emery LLP

(57) ABSTRACT

A rotation detecting device A, in which a body 5 being detected, for rotation with a front wheel (wheel) 10 is mounted on that insertion portion 1a of a housing 1, through which an axle shaft S is inserted, and rotation of the body 5 being detected is detected by a magnetism detecting element (magnetism detecting means) 3, the body 5 being detected comprising a cylindrical portion (detecting portion) 5a, rotation of which is detected by the magnetism detecting element 3, and an elastic rotation transmitting portion (rotation transmitting portion) 5c for transmitting rotation of the front wheel 10 to the cylindrical portion 5a.

7 Claims, 5 Drawing Sheets

(a)

(b) B-B

ROTATION DETECTING DEVICE FOR DETECTING ROTATION OF A VEHICLE WHEEL

TECHNICAL FIELD

The present invention relates to an electric type rotation detecting device for detecting rotation of a wheel of a two-wheeler, for example, autobicycles, bicycles, or the like, and transmitting the detected signal to a speedometer, or the like.

BACKGROUND ART

JP-A-2-264817 discloses a conventional rotation detecting device adopting a configuration, in which a magnetism detecting element composed of a hall IC, or the like, mounted on a circuit board, and a magnet are arranged on a substantially cylindrical-shaped resin casing, which comprises a detection surface for detection of a body being detected, in a manner to extend along the detection surface, and the circuit board, magnetism detecting element, and the magnet are sealed by a sealing material such as epoxy. In the case where the rotation detecting device is used as a rotation detecting device for a two-wheeler (for example, autobicycles), it is general that the rotation detecting device is mounted on a transmission casing, sprocket cover, or the like, of the vehicle and transmission gears, sprockets, or the like, rotating therein serve as a body being detected for detection.

In the case where such rotation detecting device is used to detect transmission gears, sprockets, or the like, as a body being detected, there is caused a problem that since the body being detected involves some clearances and so the body rigidity, displacement, or the like, of the vehicle (two-wheeler) causes vibrations on the body being detected, which varies a gap in a detection position associated with the body being detected and the rotation detecting device, changes in magnetism are generated in the rotation detecting device to make a detection noise, which leads to the cause of malfunctioning of, for example, an indicating instrument for indicating a speed, in accordance with output data, which are output from the rotation detecting device. Taking notice of such problem, the applicant of the present application has proposed a rotation detecting device, which is disclosed in JP-A-9-229714.

This rotation detecting device is adapted to be mounted on a front wheel (wheel) in a two-wheeler such as autobicycles, and constructed to comprise a housing provided with an insertion portion, through which an axle shaft mounting thereon the front wheel is inserted, the insertion portion having a plurality of magnetic poles for rotation with the front wheel, the rotation detecting device mounting thereon a body being detected, which body is made of a magnetic medium such as plastic magnet, and magnetism detecting means made of a hall IC, or the like, for detecting a change in the magnetic poles, caused by rotation of the body being detected.

With the body being detected, a cylindrical portion having the magnetic poles and rotation transmitting pieces for transmitting rotation of the front wheel to the cylindrical portion are formed integral by means of a plastic magnet, or the like. The rotation transmitting pieces are formed to extend outside of the cylindrical portion on an opening side of the housing so as to correspond to a recessed mount provided on a hub of the front wheel, the rotation transmitting pieces being provided in a plurality of locations on a peripheral edge of the cylindrical portion.

The rotation detecting device constructed in the above manner is arranged in a state, in which it is interposed between the front wheel and a front fork. More specifically, the rotation detecting device is arranged in a state, in which it is interposed between the front wheel and the front fork, by inserting the axle shaft, on which the front wheel is mounted, into the insertion portion, fitting the rotation transmitting pieces into the mount provided on the hub of the front wheel, and using nut members to fix the axle shaft, which projects outside the housing from the insertion portion, through the front fork.

When the rotation transmitting portion of the rotation detecting device is fitted into the mount of the hub in the manufacturing process of mounting such rotation detecting device to the hub, it is difficult to visually confirm whether the rotation transmitting pieces are fitted into the mount. Accordingly, there is caused a problem that there is a fear of breakage of the rotation transmitting pieces composed of the plastic magnet when the rotation detecting device is clamped between the hub and the front fork in an inappropriate state, in which the rotation transmitting pieces are not fitted into the mount.

The present invention takes notice of the problem and provides a rotation detecting device capable of being mounted to a hub of a wheel, without breakage of constituent parts of the rotation detecting device, even in the case where the rotation detecting device is arranged on the wheel in an inappropriate state.

DISCLOSURE OF THE INVENTION

The invention provides a rotation detecting device, in which a body being detected, for rotation with a wheel is mounted on that insertion portion of a housing, through which an axle shaft is inserted, and rotation of the body being detected is detected by magnetism detecting means, characterized in that the body being detected comprises a detecting portion, rotation of which is detected by the magnetism detecting means, and a rotation transmitting portion for transmitting rotation of the wheel to the detecting portion, and the rotation transmitting portion is made of an elastic member.

With such constitution, the rotation transmitting portion is made of an elastic member whereby the rotation detecting device can be mounted to the hub of the wheel without breakage of constituent parts of the rotation detecting device, even in the case where the rotation detecting device is arranged on the wheel in an inappropriate state, and there is caused no need of exchanging the body being detected (exchange of constituent parts) and exchanging the rotation detecting device itself, thereby enabling enhancing the yield of rotation detecting devices in the manufacturing process.

The invention has a feature in that the detecting portion comprises a first fixing portion or portions provided substantially perpendicular to the axle shaft, and the rotation transmitting portion comprises a second fixing portion or portions joined to the first fixing portion.

With such constitution, by joining the first fixing portion or portions and the second fixing portion or portions together, it is possible to prevent the both portions from being separated from each other and to prevent idling of the detecting portion when the body being detected is rotated.

Also, the invention has a feature in that one of the first and second fixing portions comprises a projection or projections provided substantially perpendicular to the axle shaft, and the other of the first and second fixing portions comprises a recess or recesses formed to correspond to the projection or projections.

With such constitution, by joining the first fixing portion or portions and the second fixing portion or portions together, it is possible by means of concavo-convex fitting of joining portions of the detecting portion and the rotation transmitting portion to prevent the both portions from being separated from each other and to prevent idling of the detecting portion when the body being detected is rotated.

Also, the invention has a feature in that an abutting portion to abut against the insertion portion is provided on the rotation transmitting portion, and a gap is formed between the insertion portion and the detecting portion.

With such constitution, by providing the abutting portion and forming the gap between the insertion portion and the detecting portion, an inner peripheral surface of the detecting portion can be made not to abut against the insertion portion, so that it is possible to prevent abrasion of the detecting portion.

Also, the invention has a feature in that the detecting portion and the rotation transmitting portion are provided separately on the body being detected.

With such constitution, the detecting portion and the rotation transmitting portion are provided separately on the body being detected, whereby it suffices to exchange only the rotation transmitting portion even if an inappropriate mount state were repeated several times and the rotation transmitting portion were broken, and so it is possible to reduce the cost for disposal of parts, caused by breakage.

Also, the invention has a feature in that the detecting portion and the rotation transmitting portion are joined together by means of concavo-convex fitting.

With such constitution, the detecting portion and the rotation transmitting portion are joined together by means of concavo-convex fitting whereby joining by means of concavo-convex fitting affords transmission of rotation free of shaking in rotation of the detecting portion when rotation of the front wheel is transmitted to the detecting portion through the rotation transmitting portion, so that rotation can be favorably detected by the magnetism detecting means.

Also, the invention has a feature in that the body being detected is formed integrally by insert-molding of the detecting portion and the rotation transmitting portion.

With such constitution, the detecting portion and the rotation transmitting portion are insert-molded whereby the detecting portion and the rotation transmitting portion can be formed integrally and so it is possible to inhibit the rotation transmitting portion from falling off, or being shifted in a mount position when mounted on a vehicle (two-wheeler) in the manufacturing process. Also, the rotation transmitting portion is insert-molded to the detecting portion and the both portions are formed integrally whereby the assembling process of assembling the detecting portion and the rotation transmitting portion together is dispensed with, which provides a constitution of the body being detected, of excellent productivity.

Also, the invention has a feature in that the rotation transmitting portion is made of a lubricating material having the elasticity.

With such constitution, since the rotation transmitting portion is made of a lubricating material having the lubrication, lubrication can be ensured even when any lubricant is not applied on that portion, which abuts against the outer peripheral surface of the insertion portion.

BRIEF DESCRIPTION OF THE DRAWINGS

FIG. 1 being a view showing a rotation detecting device,

FIG. 2 being a view showing an assembled state of a portion being detected, of the rotation detecting device, and FIG. 3 being a view showing a body being detected, of the rotation detecting device.

FIG. 4 being a view showing a rotation detecting device, and

FIG. 5 being a view showing an elastic rotation transmitting portion of the rotation detecting device.

BEST MODE FOR CARRYING OUT THE INVENTION

Embodiments of the invention will be described below taking the case of a rotation detecting device for detecting the rotating speed of wheels of an autobicycle with reference to the drawings.

Figure 1:
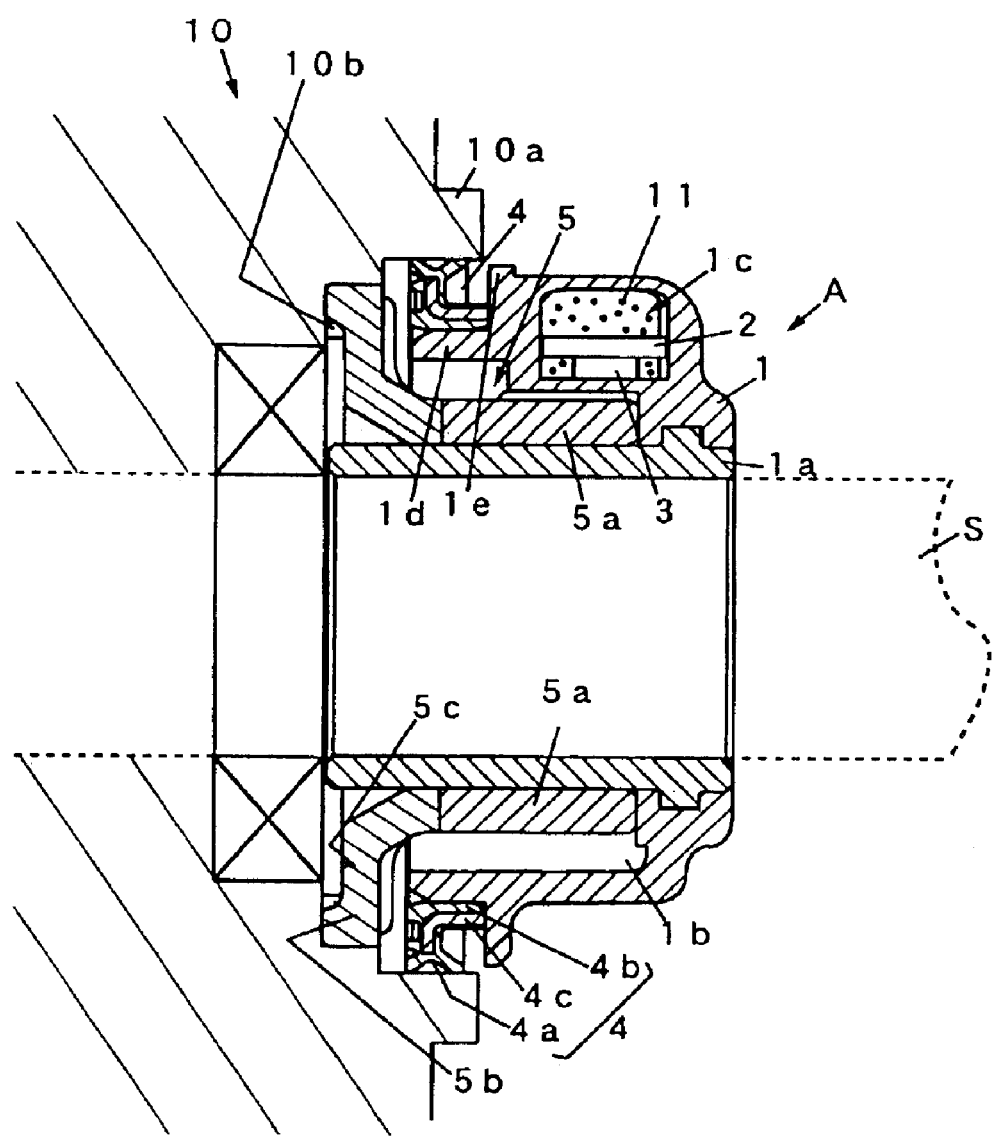
FIGS. 1 to 3 are views showing a first embodiment.
Figure 2:
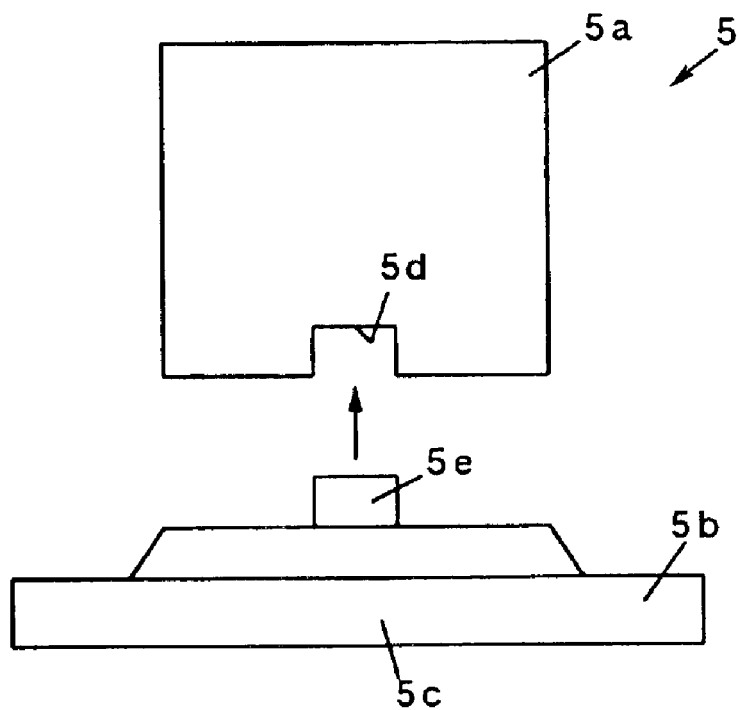
Figure 3:
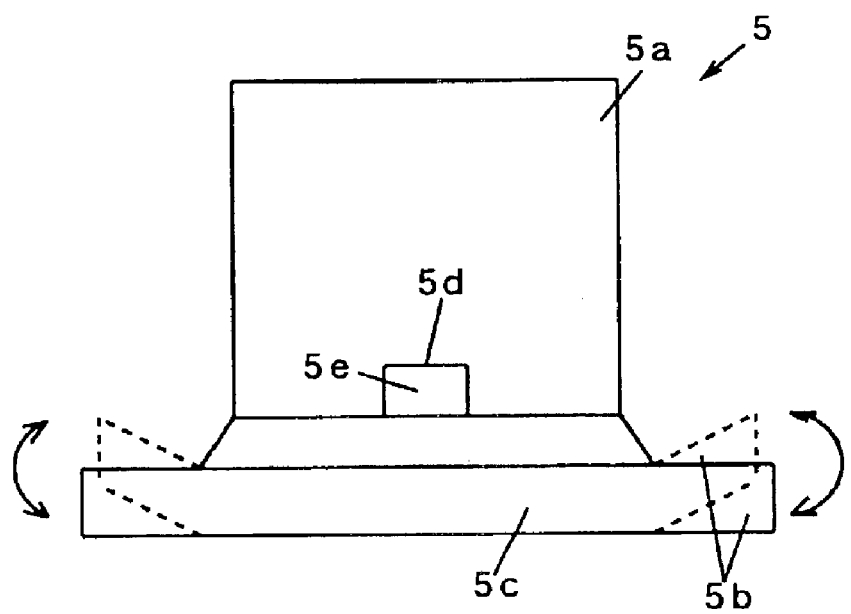

In FIGS. 1 to 3, a rotation detecting device A according to a first embodiment of the invention comprises a housing 1 made of a resin material, a circuit board 2 provided with a predetermined wiring pattern (not shown), a magnetism detecting element (magnetism detecting means) 3, an elastic member 4 made of a rubber material, and a body 5 being detected.

The housing 1 is made of a resin material such as polybutylene terephthalate or nylon, an axle shaft S is inserted substantially centrally of the housing 1, and a cylindrical-shaped insertion portion 1a is made of a metallic material and insert-molded. Formed on a peripheral edge of the insertion portion 1a is a first storage portion 1b for permitting the body 5 being detected, described later, to be rotatably arranged on an outer periphery of the insertion portion 1a, and formed outside the other end of the first storage portion 1b is a second storage portion 1c for storing the circuit board 2 and the magnetism detecting element 3 installed on the circuit board 2. Also, formed on an outer periphery (peripheral edge of the first storage portion 1b) of the housing 1 is a projecting piece 1d projecting toward a front wheel 10.

The circuit board 2 comprises a substrate made of an insulating material such as glass epoxy and formed with a predetermined wiring pattern, and the magnetism detecting element 3 and electronic parts (not shown) composed of capacitors, or the like, are electrically fixed to the circuit board as by soldering. Also, the circuit board 2 is provided with wiring cords (not shown), which serve to supply electricity to the magnetism detecting element 3 and transmit an output signal from the magnetism detecting element 3 to an indicating instrument (not shown) (for example, a speedometer), the wiring cords being electrically connected to predetermined locations on the circuit board 2 by soldering. Such circuit board 2 is arranged and fixed by filling a sealing material 11 made of an epoxy resin, or the like, into the second storage portion 1c after the board is arranged in the second storage portion 1c.

The magnetism detecting element 3 comprises reed switches, hall ICs, MR elements (semiconductor magnetoresistive element), or the like to detect a change in magnetic poles of the body 5 being detected.

The elastic member 4 is made of a nitryl or silicone based rubber material, the elastic member 4 being thin and cylindrical-shaped. Formed on a side end surface of the elastic member 4 are an abutting portion 4a having a substantially V-shaped cross section to abut against an mount portion 10b of a hub 10a of the front wheel 10 to gas tightly arrange the housing 1 of the rotation detecting device A on the hub 10a, and an upright portion 4b extended upward from the abutting portion 4a. And insert-molded inside the upright portion 4b is a holding member 4c having a substantially L-shaped cross section and made of a metallic material. Since the upright portion 4b of the elastic member 4 is formed such that its inner periphery is somewhat smaller in diameter than an outer diameter of the projecting piece 1d of the housing 1, the elastic member 4 is arranged and fixed by press fitting so that an upper end of the upright portion 4b abuts against a flange portion 1e of the housing 1.

The body 5 being detected is formed with a cylindrical portion (detecting portion) 5a for insertion of the insertion portion 1a of the housing 1 therethrough, the cylindrical portion 5a being polarised to have, for example, eight poles, on a surface thereof. In addition, the cylindrical portion 5a is made of, for example, plastic magnet, or the like. Also, the body 5 being detected is provided with an elastic rotation transmitting portion 5c having a plurality of pieces 5b, which are composed of an elastic member made of a resin material such as nylon, polyacetal, or polyimide, and a metallic material such as spring steel or SPC rolled steel, and fitted into the mount portion 10b formed on the hub 10a of the front wheel 10.

The cylindrical portion 5a and the elastic rotation transmitting portion 5c of the body 5 being detected are joined together by concavo-convex fitting as shown in FIG. 2. More specifically, a plurality of recesses 5d are formed on that portion of an end of the cylindrical portion 5a, which is opposed to the elastic rotation transmitting portion 5c, and a plurality of projections 5e are formed on the elastic rotation transmitting portion 5c to correspond to the respective recesses 5d, both elements 5a, 5c being joined together by concavo-convex fitting.

The above constituents constitute the rotation detecting device A.

When such rotation detecting device A is mounted on a vehicle (two-wheeler) in a manufacturing process, it is clamped between a front fork (not shown) and the front wheel 10 in a state (referred below to as inappropriate state), in which the pieces 5b of the elastic rotation transmitting portion 5c formed on the body 5 being detected are not arranged on the mount portion 10b formed on the hub 10a, then the rotation detecting device A is confirmed to be mounted in an inappropriate state while the pieces 5b of the elastic rotation transmitting portion 5c are deformed as indicated by dotted lines in FIG. 3, and the rotation detecting device A is disengaged from the front wheel 10 whereby the pieces 5b of the elastic rotation transmitting portion 5c can be restored to an original state. Therefore, it becomes possible to restore the pieces 5b of the elastic rotation transmitting portion 5c to an original state to arrange the same in an appropriate state on the mount portion 10b formed on the hub 10a. Therefore, since breakage of the body 5 being detected is eliminated unlike a conventional rotation detecting device A, there is caused no need of exchanging the body 5 being detected (exchange of constituent parts) and exchanging the rotation detecting device A itself, thereby enabling enhancing the yield of rotation detecting devices A in the manufacturing process.

Also, with the body 5 being detected, the cylindrical portion 5a and the elastic rotation transmitting portion 5c are provided separately from each other. Accordingly, even if the inappropriate state were repeated several times and the pieces 5b of the elastic rotation transmitting portion 5c were broken, it suffices to exchange only the elastic rotation transmitting portion 5c, thus enabling reducing the cost for disposal of parts, caused by breakage.

Also, the cylindrical portion 5a and the elastic rotation transmitting portion 5c are joined together by concavo-convex fitting, and joining of the both elements 5a, 5c by means of concavo-convex fitting affords transmission of rotation free of shaking in rotation of the cylindrical portion 5a when rotation of the front wheel 10 is transmitted to the cylindrical portion 5a through the elastic rotation transmitting portion 5c, so that rotation can be favorably detected by the magnetism detecting element 3.

Figure 4:
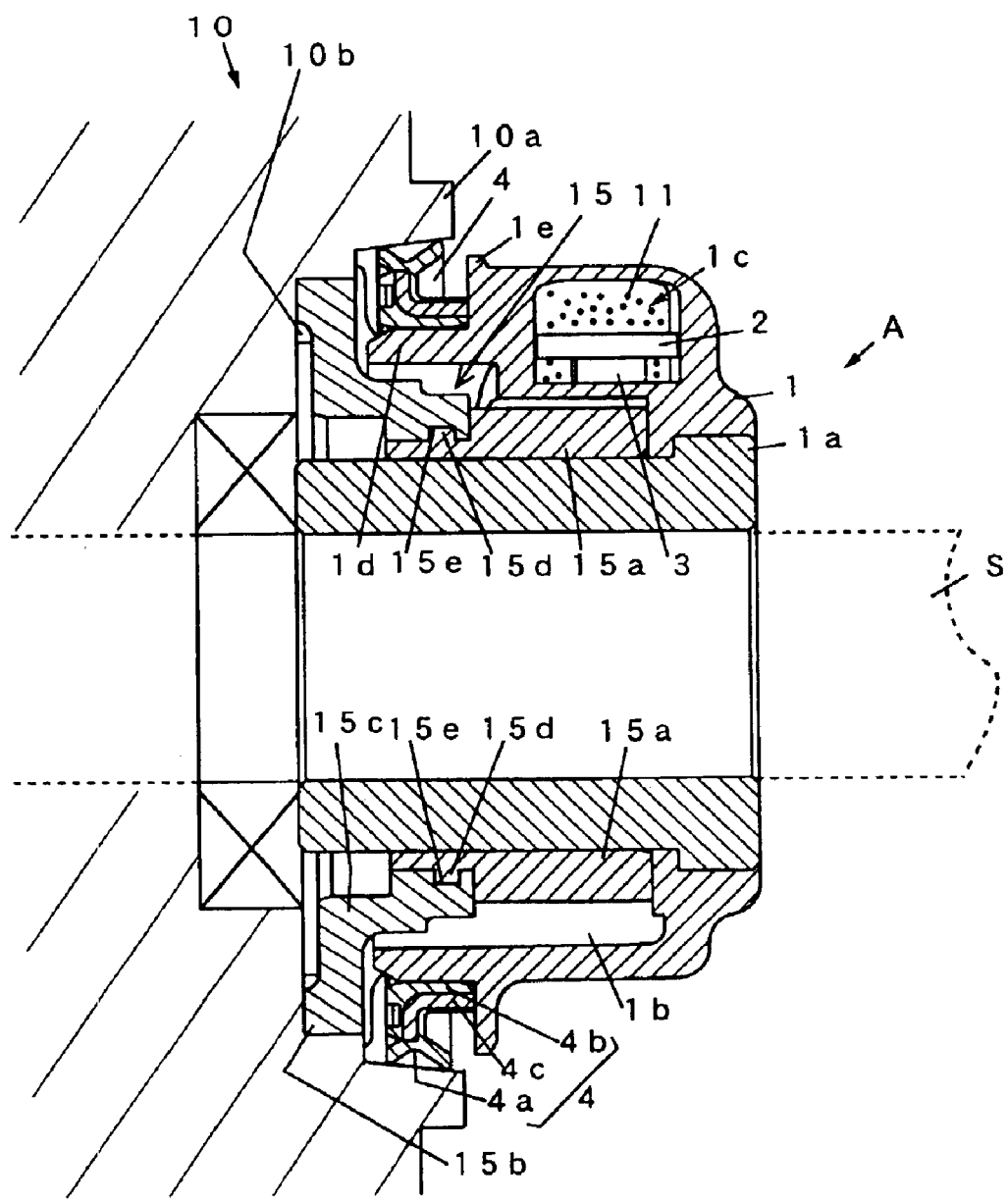
FIGS. 4 and 5 are views showing a second embodiment.
Figure 5:
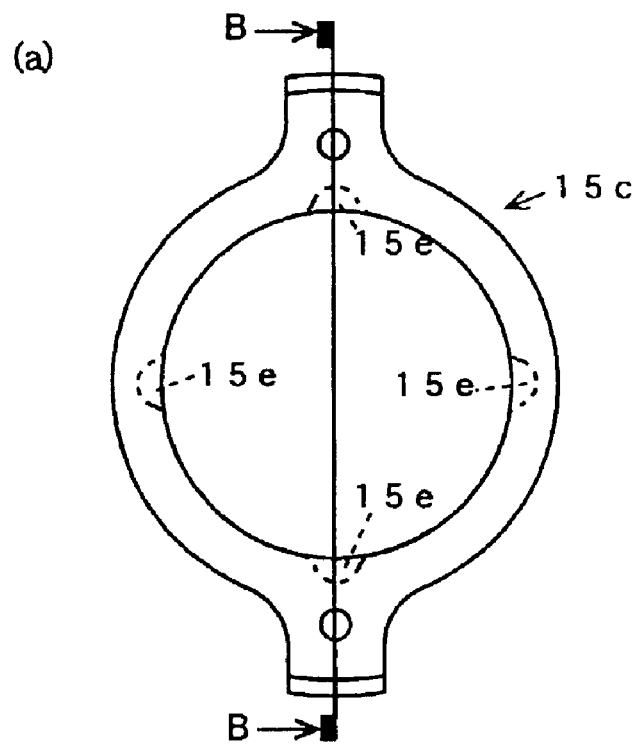
Figure 5:
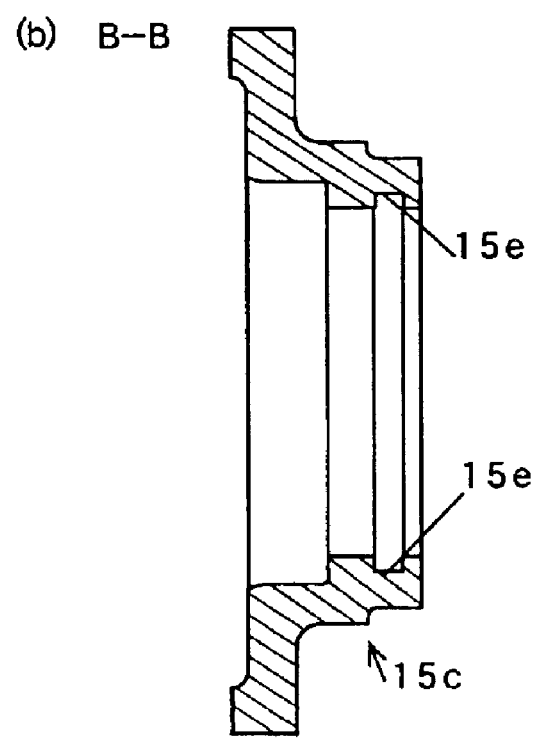

FIGS. 4 and 5 show a second embodiment of the invention, the same reference numerals denoting parts, which are the same as or corresponding to those in the first embodiment, and an explanation therefor being omitted.

In FIGS. 4 and 5, a rotation detecting device A according to the second embodiment of the invention comprises a housing 1, a circuit board 2, a magnetism detecting element 3, an elastic member 4, and a body 15 being detected.

The embodiment is different from the first embodiment in the construction of the body being detected. The body 15 being detected comprises a cylindrical portion 15a being polarised, and an elastic rotation transmitting portion 15c provided with a piece 15b, which is provided corresponding to the mount portion 10b formed on the hub 10a of the front wheel 10, the elastic rotation transmitting portion 15c and the cylindrical portion 15a being formed integrally by means of insert-molding. The cylindrical portion 15a is polarised to have a plurality of poles on an outer peripheral surface thereof, and provided with first fixing portions 15d, which comprise a plurality of projections formed in a manner to project substantially perpendicular to the axle shaft S, in an area where the cylindrical portion is joined to the elastic rotation transmitting portion 15c disposed on a lower end thereof. The elastic rotation transmitting portion 15c is provided with second fixing portions 15e, which comprise a plurality of recesses corresponding to the first fixing portions 15d, in an area where the elastic rotation transmitting portion is joined to the cylindrical portion 15a disposed in the first storage portion 1b of the housing 1 in a direction of depth from the piece 15b. FIGS. 5(a) and 5(b) show locations, in which the second fixing portions 15e are formed, the second fixing portions being formed in four locations on an inner peripheral surface of the elastic rotation transmitting portion 15c, and the first fixing portions 15d being also formed on the cylindrical portion 15a to be the same in number as the second fixing portions. In addition, it suffices that the first and second fixing portions be one or more in number, and the number is not limited to that in the second embodiment.

In the case where the body being detected is composed of the cylindrical portion 15a being a detecting portion and the elastic rotation transmitting portion 15c, it is feared that the elastic rotation transmitting portion falls off when the rotation detecting device A is mounted on a vehicle (two-wheeler) in the manufacturing process. Also, when the body being detected is rotated, it is feared that the cylindrical portion and the elastic rotation transmitting portion are separated from each other and the cylindrical portion idles.

In connection with the above, the elastic rotation transmitting portion 15c and the cylindrical portion 15a can be formed integrally by insert-molding the elastic rotation transmitting portion 15c and the cylindrical portion 15a, and so it is possible to inhibit the elastic rotation transmitting portion from falling off, or being shifted in a mount position when the rotation detecting device A is mounted on a vehicle (two-wheeler) in the manufacturing process. Also, with the rotation detecting device A, the elastic rotation transmitting portion 15c is insert-molded on the cylindrical portion 15a and so the both members are formed integrally, whereby the assembling process of assembling the cylindrical portion 15a and the elastic rotation transmitting portion together is dispensed with, which provides a constitution of a body being detected, of excellent productivity.

Also, the first fixing portions 15d comprising projections provided substantially perpendicular to the axle shaft S are provided on the cylindrical portion 15a, the second fixing portions 15e comprising recesses corresponding to the first fixing portions 15d are provided on the elastic rotation transmitting portion 15c, and the first fixing portions 15d and the second fixing portions 15e are joined together to provide for concavo-convex fitting of joining portions of the cylindrical portion 15a and the elastic rotation transmitting portion 15c, whereby it is possible to prevent separation of the both portions from each other, and so it is possible to prevent the cylindrical portion 15a from idling when the body 15 being detected is rotated.

Also, with the second embodiment of the invention, while the first fixing portions 15d comprise projections provided on the cylindrical portion 15a to be substantially perpendicular to the axle shaft S and the second fixing portions 15e comprise recesses formed on the elastic rotation transmitting portion 15c to correspond to the first fixing portions 15c, recesses may be provided as first fixing portions on the cylindrical portion 15a to be substantially perpendicular to the axle shaft S and projections may be provided as second fixing portions on the elastic rotation transmitting portion 15c to correspond to the recesses.

Figure 6:
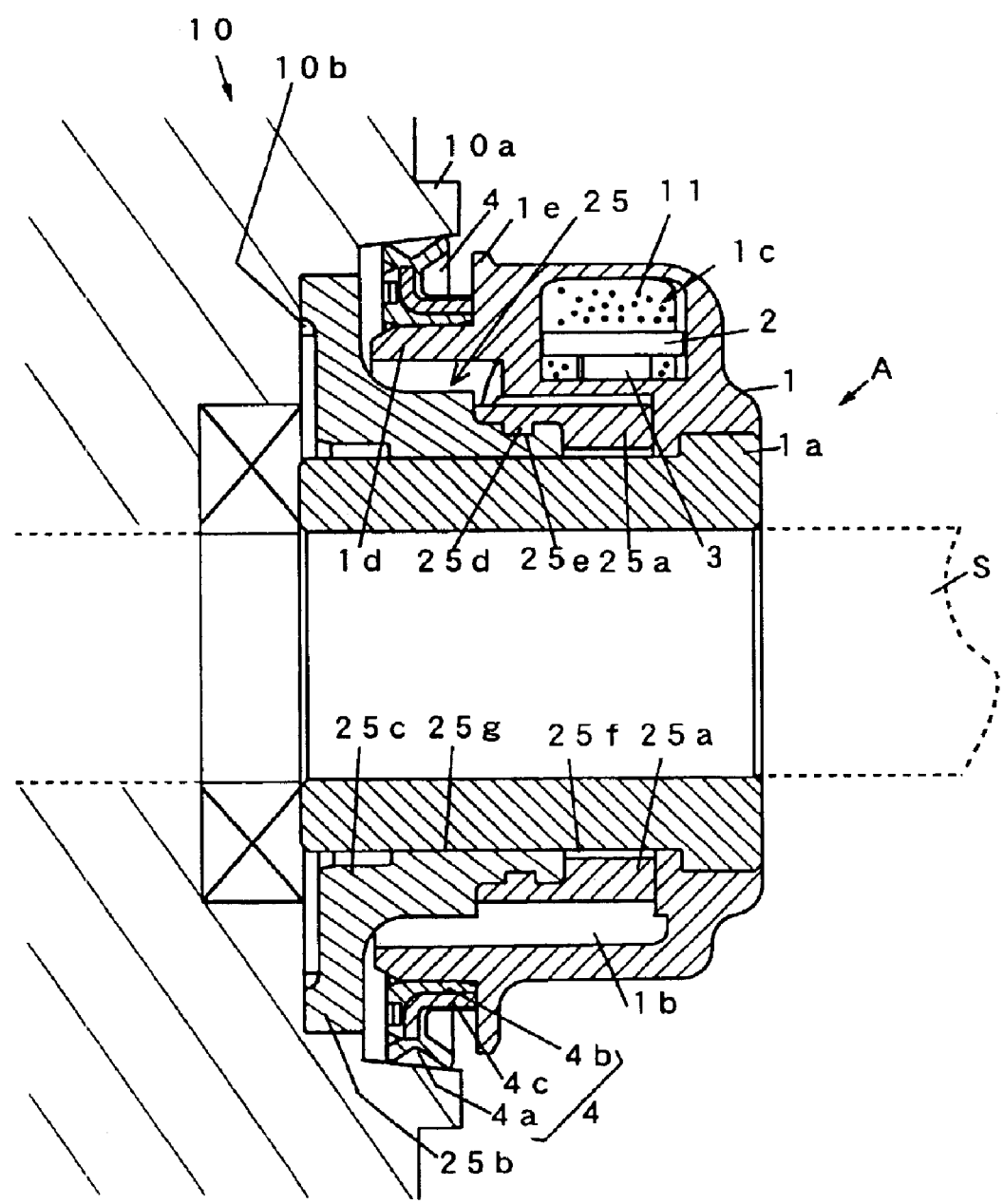
FIG. 6 is a view showing a third embodiment and a rotation detecting device.

FIG. 6 shows a third embodiment of the invention, the same reference numerals denoting parts, which are the same as or corresponding to those in the first and second embodiments, and an explanation therefor being omitted.

In FIG. 6, a rotation detecting device A according to the third embodiment of the invention comprises a housing 1, a circuit board 2, a magnetism detecting element 3, an elastic member 4, and a body 25 being detected.

The embodiment is different from the first and second embodiments in the construction of the body being detected. The body 25 being detected comprises a cylindrical portion 25a being polarised, and an elastic rotation transmitting portion 25c provided with a piece 25b, which is provided corresponding to the mount portion 10b formed on the hub 10a of the front wheel 10, the elastic rotation transmitting portion 25c and the cylindrical portion 25a being formed integrally by means of insert-molding. Also, like the second embodiment, the body 25 being detected comprises, in an area where the cylindrical portion 25a and the elastic rotation transmitting portion 25c are joined to each other, first fixing portions 25d provided on the cylindrical portion 25a to comprise projections projecting substantially perpendicular to the axle shaft S, and second fixing portions 25e provided on the elastic rotation transmitting portion 25c to comprise recesses corresponding to the first fixing portions 25d. The cylindrical portion 25a is polarised to have a plurality of poles on an outer peripheral surface thereof, and a gap 25f is formed between an inner peripheral surface thereof, which is disposed in the first storage portion 1b in a direction of depth from an area where it is joined to the elastic rotation transmitting portion 25c, and the outer peripheral surface of the insertion portion 1a of the housing 1. The elastic rotation transmitting portion 25c is made of a lubricating resin material, such as nylon or polyacetal, having the elasticity to comprise an abutting portion 25g on an inner peripheral surface disposed in the first storage portion 1b in a direction of depth from the piece 25b, the abutting portion being adapted to abut against the outer peripheral surface of the insertion portion 1a.

The rotation detecting device A according to the third embodiment is constructed to take account, in the construction of body being detected according to the first and second embodiments, of friction between the outer peripheral surface of the insertion portion 1a and the inner peripheral surface of the cylindrical portion 5, 15 when the body 5, 15 being detected is rotated. Also, the construction takes account of a conventional need of applying a lubricant such as grease, on surroundings of locations of abutment for prevention of abrasion of the body being detected.

More specifically, with the rotation detecting device A, since the abutting portion 25g adapted to abut against the outer peripheral surface of the insertion portion 1a of the housing 1 is provided on the inner peripheral surface of the elastic rotation transmitting portion 25c made of a lubricating material having the elasticity, and the gap 25f is provided between the inner peripheral surface of the cylindrical portion 25a and the outer peripheral surface of the insertion portion 1a to thereby enable preventing the inner peripheral surface of the cylindrical portion 25a from abutting against the insertion portion 1a, abrasion of the cylindrical portion 25a can be prevented, and since the abutting portion 25d is made of a lubricating material, lubrication can be ensured even when the lubricant is not applied on that portion, which abuts against the outer peripheral surface of the insertion portion 1a.

In addition, while the body 25 being detected, in the third embodiment of the invention is made by insert-molding of the cylindrical portion 25a and the elastic rotation transmitting portion 25c, the body being detected may be made by joining a cylindrical portion and an elastic rotation transmitting portion by means of concavo-convex fitting.

INDUSTRIAL APPLICABILITY

The invention is suited to an electric type rotation detecting device for detecting rotation of a wheel of a two-wheeler, for example, autobicycles, bicycles, or the like, and transmitting the detected signal to a speedometer, or the like.

What is claimed is:

1. A rotation detecting device, in which a body being detected, for rotation with a wheel is mounted on that insertion portion of a housing, through which an axle shaft is inserted, and rotation of the body being detected is detected by magnetism detecting means, characterized in that the body being detected comprises a detecting portion, rotation of which is detected by the magnetism detecting means, and a rotation transmitting portion for transmitting rotation of the wheel to the detecting portion, and the rotation transmitting portion is made of an elastic member,
   wherein the detecting portion comprises a first fixing portion or portions provided substantially perpendicular to the axle shaft, and the rotation transmitting portion comprises a second fixing portion or portions joined to the first fixing portion,
   wherein one of the first and second fixing portions comprises a projection or projections provided substantially perpendicular to the axle shaft, and the other of the first and second fixing portions comprises a recess or recesses formed to correspond to the projection or projections.

2. The rotation detecting device according to claim 1, wherein the detecting portion and the rotation transmitting portion are provided separately on the body being detected.

3. The rotation detecting device according to claim 2, wherein the detecting portion and the rotation transmitting portion are joined together by means of concavo-convex fitting.

4. The rotation detecting device according to claim 1, wherein the body being detected is formed integrally by insert-molding of the detecting portion and the rotation transmitting portion.

5. The rotation detecting device according to claim 1, wherein the rotation transmitting portion is made of a lubricating material having the elasticity.

6. The rotation detecting device according to claim 1, wherein the detecting portion is cylindrical-shaped and comprises a plurality of magnetic poles on a peripheral edge thereof.

7. A rotation detecting device, in which a body being detected, for rotation with a wheel is mounted on that insertion portion of a housing, through which an axle shaft is inserted, and rotation of the body being detected is detected by magnetism detecting means, characterized in that the body being detected comprises a detecting portion, rotation of which is detected by the magnetism detecting means, and a rotation transmitting portion for transmitting rotation of the wheel to the detecting portion, and the rotation transmitting portion is made of an elastic member, wherein an abutting portion to abut against the insertion portion is provided on the rotation transmitting portion, and a gap is formed between the insertion portion and the detecting portion.

\* \* \* \* \*